United States Patent [19]

Upton

[11] 4,202,387
[45] May 13, 1980

[54] FLUID DISPENSING CONTROL SYSTEM

[76] Inventor: Douglas J. Upton, 18740 Devonshire, Northridge, Calif. 91324

[21] Appl. No.: 823,228

[22] Filed: Aug. 10, 1977

[51] Int. Cl.² .............................................. B65B 3/04
[52] U.S. Cl. ..................................... 141/360; 222/23; 222/37; 222/54; 222/59; 222/70; 250/577; 356/379
[58] Field of Search ........................ 222/23, 25, 26, 27, 222/28, 36, 37, 52, 70, 71, 76, 55, 59, 57, 54; 250/577, 222 R, 223 B; 356/157; 141/351, 361, 360, 362; 137/486; 221/125

[56] References Cited

U.S. PATENT DOCUMENTS

| | | | |
|---|---|---|---|
| 3,272,217 | 9/1966 | Young | 137/486 X |
| 3,273,752 | 9/1966 | Horeczky | 222/52 |
| 3,310,203 | 3/1967 | McCann | 222/54 |
| 3,349,881 | 10/1967 | Camp | 221/125 X |
| 3,666,143 | 5/1972 | Weston | 222/37 X |
| 3,823,846 | 7/1974 | Probst | 222/70 |
| 3,895,738 | 7/1975 | Buchanan et al. | 222/28 X |
| 3,976,222 | 8/1976 | Spagnolo | 222/70 |
| 4,040,457 | 8/1977 | Niese et al. | 141/361 |

Primary Examiner—Joseph J. Rolla
Attorney, Agent, or Firm—Roger A. Marrs

[57] ABSTRACT

In this fluid dispensing control system, the size of a container to be filled is established by a set of photosensors mounted on the dispenser housing. Discrimination circuitry distinguishes between ambient light level and light reflected from the container that is placed under the spout. Delay and lock-out circuitry is provided to insure that an erroneous size-indicating signal is not generated as the container is moved into position, and to insure that the size-indicating signal does not change once pouring has begun. Timer circuitry controls the pouring duration and insures complete, uniform filling of each size container. Counter and display circuitry tallies the number of containers, of each size that have been filled, and indicates the total volume of fluid that has been dispensed.

16 Claims, 8 Drawing Figures

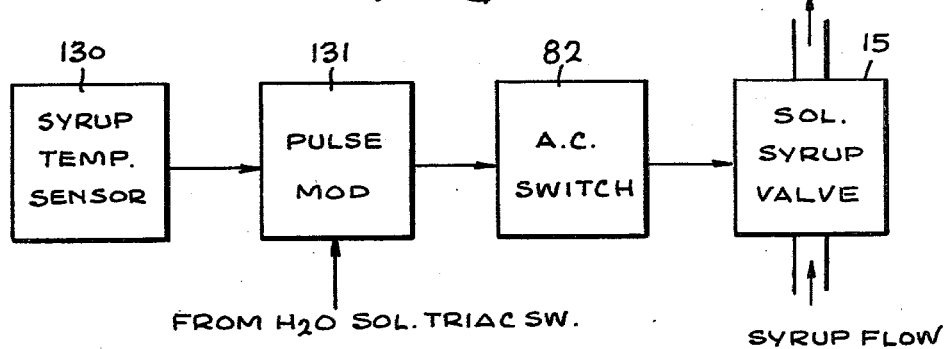
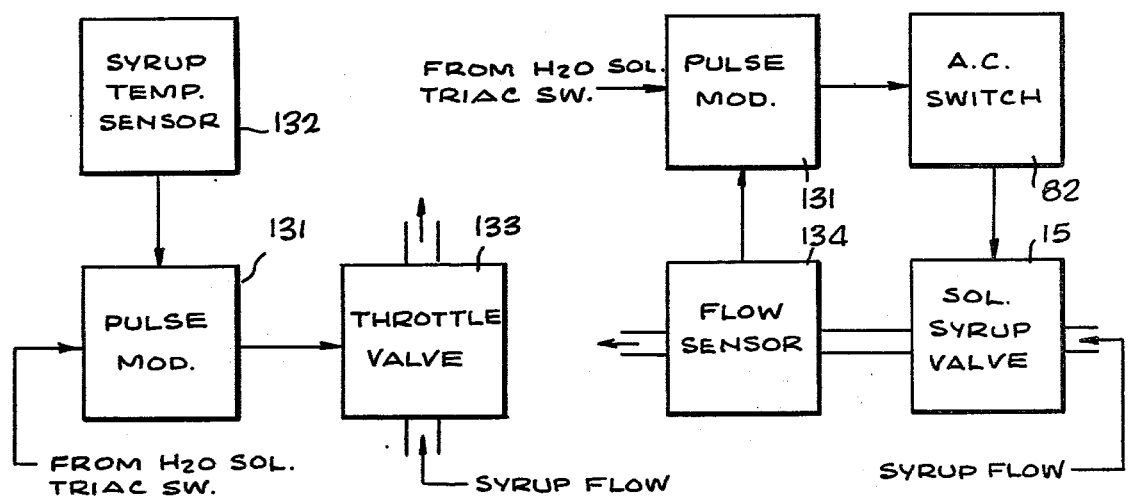
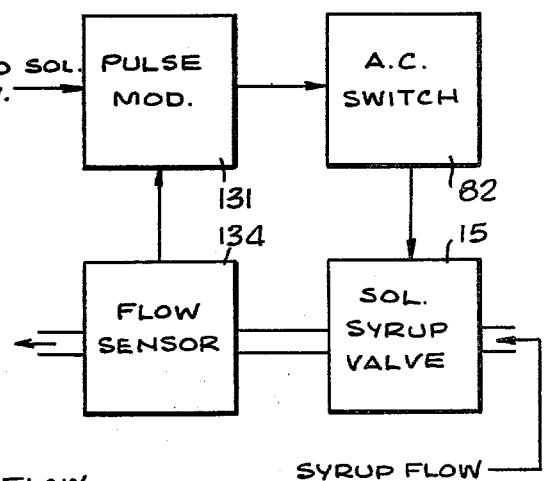
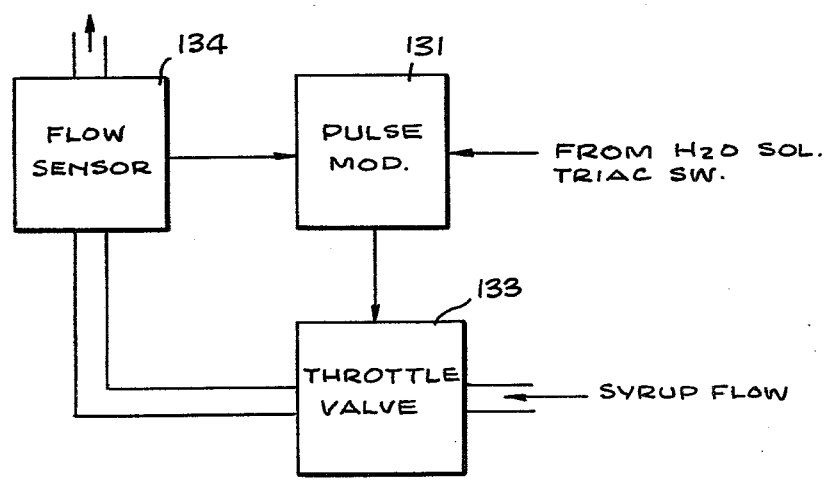

FLUID DISPENSING CONTROL SYSTEM

BACKGROUND OF THE INVENTION

1. Field of the Invention

The present invention relates to a fluid dispensing control system useful for automatically filling containers of different sizes with a beverage, and for tallying how many containers of each size have been filled, and what total volume of beverage has been dispensed.

2. Description of the Prior Art

It is very common in restaurants, bars, and other retail food operations to dispense beverages such as soft drinks or milk via set of dispensing heads connected to a common supply source. Each head includes one or more valve-operated spouts through which the beverage flows into a cup or other container that is placed below the spout.

Most commonly, pouring begins when the container is pressed against a rocker-arm situated just below the spout. This arm either mechanically or electrically actuates the spout valve. The valve is held open, and fluid flow continues, for as long as the container is held against the rocker-arm.

Several shortcomings are associated with such a system. The most important is that no accurate tally can be obtained automatically of the number of containers of different sizes that have been filled. The attachment of a counter to the spout actuating rocker-arm is unsuccessful for this purpose. Even if the rocker-arm was pressed just once as each container is filled, the resultant count would correctly report on how many containers were filled, but not how many of each size. Such a total count would not be useful in calculating the monetary value or total price of the dispensed beverage. Moreover, in practice such a system would not even give an accurate tally of the number of filled containers. This is because the rocker-arm often is pressed two or three times as a single container is filled. Thus the operator will press the container against the rocker-arm until the cup is substantially full. He will then withdraw the cup from the rocker-arm to observe the fill level, or in the case of carbonated beverages, to let the carbonation settle down. He will then press the container against the rocker-arm again to complete filling. Obviously a count of the number of times the rocker-arm is actuated will not accurately indicate the total number of containers that have been filled.

There are several reasons why it is desirable to have an accurate count of how many containers of each size have been filled. First, this provides an accurate accounting check, since the number of containers of each size, times the price per size should correspond to the money collected by the cashier. Discrepancies can indicate cashier error, situations in which an employee or customer pours a beverage but forgets to charge or pay for it, or outright theft. Further, by knowing the volume of each container size, a count of the number of filled containers readily can be converted to an accounting of the total volume of beverage that has been dispensed. This permits accurate inventory control, and gives advance notice that the supplies must be replenished or reordered.

To obtain an accurate, automatic count of how many containers of different size have been filled requires some means for size recognition. An object of the present invention is to provide a fluid dispenser in which such size recognition is accomplished automatically. In one embodiment, photoelectric sensors are used in the size determination function. Several problems are associated with the use of photosensors, and it is a further object of this invention to overcome such problems. For example, as the container first is placed beneath the spout, careless initial placement or movement of the cup may actuate the photosensors associated with a container of a different size. To eliminate this problem, the present invention includes circuitry for delaying size recognition and tally until the container can be fixed in place and an accurate determination of size accomplished. A cognate problem occurs if the container is moved during the pouring operation. A further object of the present invention is to provide lockout circuitry which maintains the size determination unchanged during the pouring operation despite such movement of the container.

Another problem associated with the use of photoelectric sensing of container size has to do with changes in ambient light level. Another object of the present invention is to provide circuitry which automatically compensates for such ambient light variation, thereby insuring accurate container sensing regardless of such variation. The same circuitry insures a positive determination despite "chatter" which may result as light is reflected into the photosensors while a container is being moved into place.

Yet another object of the present invention is to provide automatic timing of the pouring operation. Thus once the container size has been established, the correct volume of fluid will be dispensed automatically. Consistent full volume dispensing is achieved, without the need for the user to actuate a rocker-arm multiple times to accomplish complete filling. Uniformity of fill volume also results.

SUMMARY OF THE INVENTION

These and other objectives are achieved by providing a fluid dispensing control system in which a signal is generated which indicates the size of the container to be filled. Valve control timer means, responsive to this selection signal, opens the spout valve for the correct duration of time requisite to fill a container of the indicated size.

In a preferred embodiment, the container size is sensed by a set of photosensors and associated light sources that are mounted on the dispensor housing beneath the spout. Each light source/photosensor assembly is located at a position appropriate to sense a container of certain size. When the container is placed on the base of the dispenser housing, light will be reflected from one or more of the light sources back into the associated photosensors. Discrimination circuitry associated with the photosensors then establishes the size of the container, depending on which of the photosensors detects such reflected light. Gating circuitry insures that only a single sizeindicating signal is generated and maintains this single signal throughout the pouring operation, even in the event that the container is moved before pouring is completed.

Compensation for changes in ambient light level is achieved by the use of a differential amplifier circuit. The ambient light establishes the reference voltage to this circuit, so that the light reflected from the container must significantly exceed the ambient level to achieve generation of the size-indicating signal. Such automatic gain control, in which the amplifier gain is established by the background light level, insures accurate system operation and also prevents erroneous readings resulting from "chatter" or intermediate level light reflection from the container as it is being moved into place.

Appropriate counter and display circuitry is provided for tallying the number of filled containers and cost of each individual size, and for tallying the volume of beverage dispensed. This counting circuitry may be common to a plurality of dispensing heads, and further circuitry is provided to insure an accurate count even though two or more containers may be filled at the same time by different heads.

BRIEF DESCRIPTION OF THE DRAWINGS

A detailed description of the invention will be made with reference to the accompanying drawings wherein like numerals designate corresponding elements in the several figures.

FIGS. 5-8 are block diagrams showing means for controlling the mixture ratio of various fluid ingredients during the dispensing period.

DESCRIPTION OF THE PREFERRED EMBODIMENTS

The following detailed description is of the best presently contemplated modes of carrying out the invention. This invention is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

Figure 1:
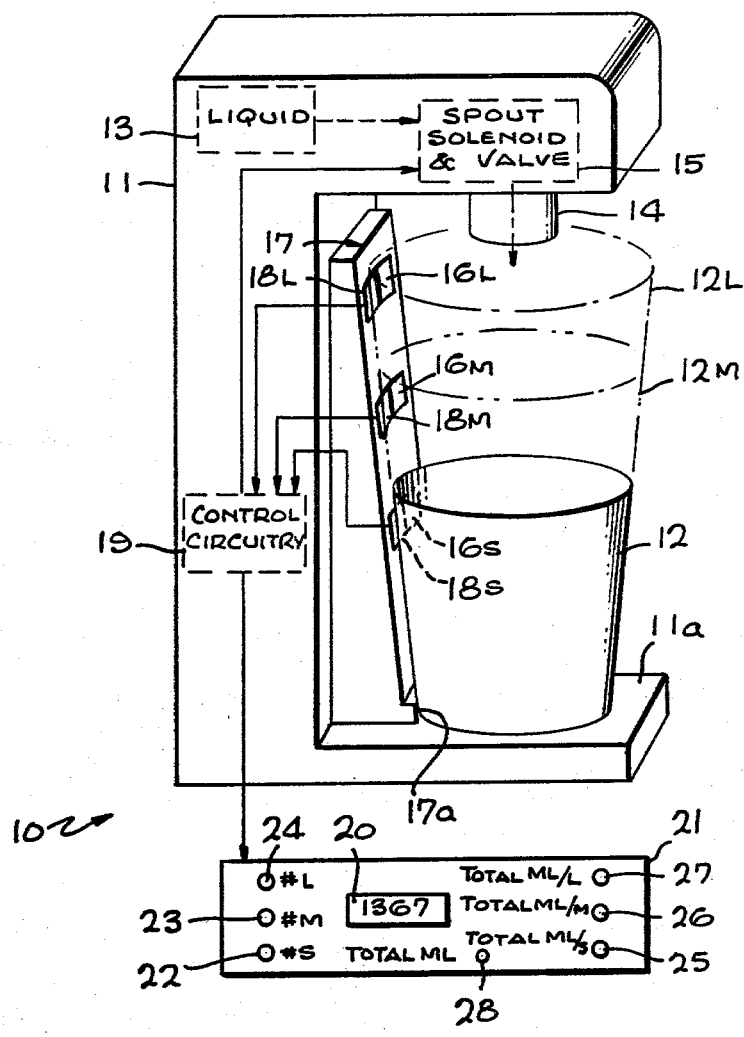
FIG. 1 is a pictorial view of a fluid dispensing control system in accordance with the present invention.

Referring to FIG. 1, the inventive fluid dispensing control system 10 includes a housing 11 having a base 11a on which is placed a cup or other container 12 to be filled. Liquid from a supply 13 is dispensed into the container 12 via a spout 14 having a solenoid-actuated valve 15. Typically the liquid source 13 will be located at a point that is remote from the housing 11, and may supply liquid to a plurality of similar dispensers.

In the embodiment of FIG. 1, the container size is determined photoelectrically. To this end, a set of photosensors 16S, 16M, and 16L are mounted on an inclined panel 17 which may be part of the housing 11. Mounted adjacent to each of the photosensors is an associated light source 18S, 18M, and 18L.

The photosensors and light sources are located such that when the bottom of the container 12 is situated on the base 11a, abutting against a strike plate 17a at the foot of the panel 17, light will be reflected from one or more of the light sources into the associated photosensors, depending on the size of the container 12. For a container of relatively small size, such as that shown in solid in FIG. 1, light will only be reflected from the source 18S into the photosensor 16S. No such light reflection will occur into the photosensors 16M and 16L. Under this condition, appropriate control circuitry 19, including the photosensor discrimination circuitry of FIG. 2 and the timing circuitry of FIG. 3, will open the spout valve 15 for the correct duration of time requisite to fill the relatively small cup 12.

If a cup of relatively medium size (as indicated in phantom at 12M in FIG. 1) is placed on the base 11a, light will be reflected back into both of the photosensors 16S and 16M. In this case, the circuitry of FIGS. 2 and 3 will open the spout valve 15 for an appropriate duration of time to fill such a medium-sized cup. Similarly, if a relatively large cup, (indicated in phantom at 12L in FIG. 1) is to be filled, light will be reflected into all three of the photosensors 16S, 16M, and 16L, and the valve 15 will be held open by the circuitry of FIGS. 2 and 3 for the longer period of time requisite to fill that container.

As each container is filled, appropriate counter circuitry (shown in FIG. 3) accumulates separate tallies of the number of containers of each size that have been filled. These can be displayed on a numeric display 20 mounted in a housing 21 (FIG. 1). In the illustrative embodiment shown, the display 20 will indicate the total number of small containers that have been filled with the push button 22 (designated S) is closed. Likewise, the total number of filled medium or large containers will be displayed respectively when the switch 23 or 24 is depressed. Additional circuitry is provided to obtain a readout of the total volume of fluid dispensed into small, medium and large containers, and of the overall volume dispensed. These readouts are obtained on the display 20 when the respective one of switches 25 through 28 is actuated.

Figure 2:
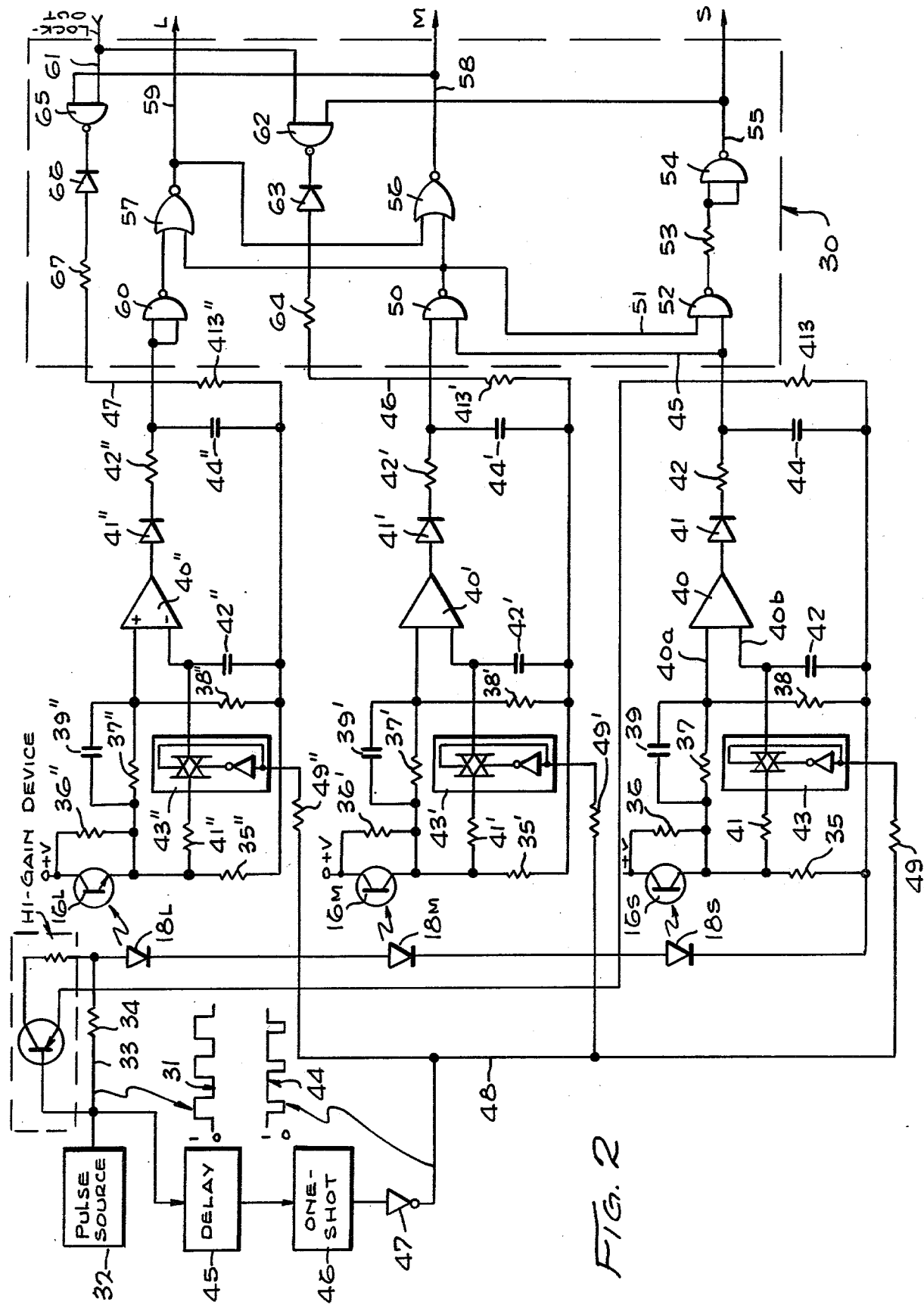
FIG. 2 is an electrical schematic diagram of photosensor circuitry for providing a signal indicative of the size of a container to be filled by the fluid dispenser of FIG. 1.

Referring to FIG. 2, there is shown discrimination circuitry 30, responsive to the output of the photosensors 16S, 16M, and 16L, for providing a single output signal S, M, or L which indicates the size of the cup that has been placed on the fluid dispenser of FIG. 1. To this end, all of the light sources 18S, 18M, and 18L advantageously comprise light emitting diodes that are pulsed on intermittently by a pulse train 31 supplied from a pulse source 32 via a line 33 and a resistor 34. Advantageously, but not necessarily, the pulses 31 are not synchronous with the ac power source. In the event that a small container 12 (such as illustrated in solid FIG. 1) is to be filled, light will only be reflected into the photosensor 16S. Advantageously, this photosensor comprises a photo-diode having optimum light response in the same portion of the spectrum as the maximum output from the corresponding light emitting diode 18S. Typically this may be in the infra-red region. The output of the diode 16S is connected via a network consisting of the resistors 35–38 and a capacitor 39 to the non-inverting input 40a of an operational amplifier 40.

To compensate for changes in the ambient light level, the gain of the amplifier 40 is controlled in response to such ambient levels. To this end, the amplifier 40 functions as a differential amplifier receiving at its reference or inverting input 40b a signal indicative of the ambient light level. This is achieved by connecting the output of the photosensor 16S to an integrator circuit consisting of a resistor 41 and a capacitor 42. In circuit with this integrator is a gate 43 operated by a voltage level present on signal 44 which may be implemented by using an integrated circuit bilateral switch such as the National Semiconductor type MM4616A or the Texas Instrument type TP4016A.

During the intervals of time that the light sources 18S, 18M, and 18L are off, the gate 43 is conducting. As a result, the capacitor 42 is charged to a level indicative of the ambient light level because when the light source 18S is off, the output of the photosensor 16S is indicative of the ambient light incident thereon. Little or no output is obtained during these periods from the amplifier 40, since substantially the same signal level indicative of the ambient light level, also is provided to the terminal 40a of the amplifier 40. Thus, both inputs 40a and 40b to the differential amplifier 40 are of about the same value, so that the amplifier output stays low.

The gate 43 is closed during the time that the light emitting diode 18S is on. This is accomplished by providing a control signal 44 to the gate 43 that is derived from the pulse train 31 on the line 33. Thus the gate control signal 44 is obtained by means of a delay circuit 45, a monostable multivibrator (one-shot) 46, an invertor 47, a line 48 and a resistor 49. With this arrangement, the gate control signal is normally high so that the gate 43 is normally on open (i.e., conducting). The delay introduced by the circuit 45 corresponds to the amount of time taken to achieve maximum response by the photosensor 16S to the light emitted from the diode 18S. Thereafter, the control signal 44 is at a low voltage level which closes the gate 43 for a duration of time established by the one-shot 46 and makes the gate conductive. This time duration is less than the on-time of the light source 18S. As a result, the gate 43 is conducting for a "window" or short period of time corresponding to the time of maximum response of the photosensor 16S to the light from the diode 18S.

During the interval that the gate 43 is conducting, the capacitor 42 retains its charge so that the reference input 40b to the amplifier 40 remains at a level indicative of the ambient light. However, during the time that the gate 43 is conducting the output of the photosensor 16S is supplied directly to the other, non-inverting input 40a of the amplifier 40. If a cup is situated in position to reflect light into the photosensor 16S, the signal level at the amplifier input 42a will considerably exceed the reference level at the input 40b. As a result, a high output signal will be obtained from the amplifier 40. This signal will be provided via a diode 41, a pair of resistors 42, 413 and a capacitor 44 to a line 45. This will be used in a gating circuit described below, to provide the appropriate container-size-indicating signal. If no cup is positioned in front of the sensor 16S when the light source 18S is on, the signal at the amplifier signal 40a will remain at the ambient light level, substantially equal to the reference signal at the input terminal 40b. Under this condition the signal on the line 45 remains low.

FIG. 2 further includes a high gain device coupled in parallel with resistor 34 on line 33. This network provides additional voltage to the signal to maintain an operational level so that the input signal circuit does not chatter or fluxuate when the cup is in a mid position short of full sensor operation.

Identical gated differential amplifier circuits are associated with each of the photosensors 16M and 16L. In FIG. 2, the corresponding components associated with these two photosensors have been identified respectively by primed and double-primed numbers. The output of the amplifier 40' will provide a low signal on line 46 when no light is reflected from the light source 18M into the photosensor 16M, and a high signal on the line 46 when reflected light is sensed by the photo-diode 16M. Similarly, the amplifier circuitry associated with the photosensor 16L normally provides a low signal on a line 47, but provides a high signal on that line when light is reflected from the source 18L into the photosensor 16L.

Gating circuitry, shown on the right-hand side of FIG. 2, is used to provide a single container-size-indicating signal S, M, or L in response to the signals present on the lines 45, 46 and 47.

To this end, when a relatively small container 12 is situated on the dispenser of FIG. 1, light only will be reflected into the sensor 16S, so that the signal on line 45 will be high and the signals on the lines 46 and 47 will be low. In this state, a NAND-gate 52 will provide a low output that is supplied via a resistor 53 to an invertor 54. As a result, a high S signal occurs on a line 55.

Under the same conditions, the high signal on the line 51 causes the outputs of a pair of NOR-gates 56 and 57 to be low. Thus, no M signal occurs, and the line 58 at the output of the NOR-gate 56 remains low. Similarly, no L signal occurs, and the line 59 from the output of the NOR-gate 57 remains low. That is, only the S signal occurs.

If a medium sized container 12M is placed beneath the spout 14, light will be reflected into the photosensors 16S and 16M, but not into the photosensor 16L. In this state, the signals on the lines 45 and 46 will be high, and the signal on the line 47 will be low.

As a result, the output of the NAND-gate 50, on the line 51, will be low. As a result, the output of the NAND-gate 52 will be high resulting in a low level on the line 55; that is no S signal is present. The low signal on the line 47 is inverted by an invertor 60 to provide one high input to the NOR-gate 57. The other input is low, so that a low level is provided on the line 59, corresponding to the absence of the L signal. Since the signals on the lines 51 and 59 both are low, the output of the NOR-gate 56 will be high, corresponding to the presence of a M signal on the line 58. Thus, as desired, only a single size-indicating signal M is present.

Similar operation occurs when a relatively large container 12L is placed beneath the spout 14. In this instance, all three lines 45, 46 and 47 are high. The gating circuitry of 42 then will produce a high L signal on line 59, while the lines 55 and 58 will remain low.

Figure 3:
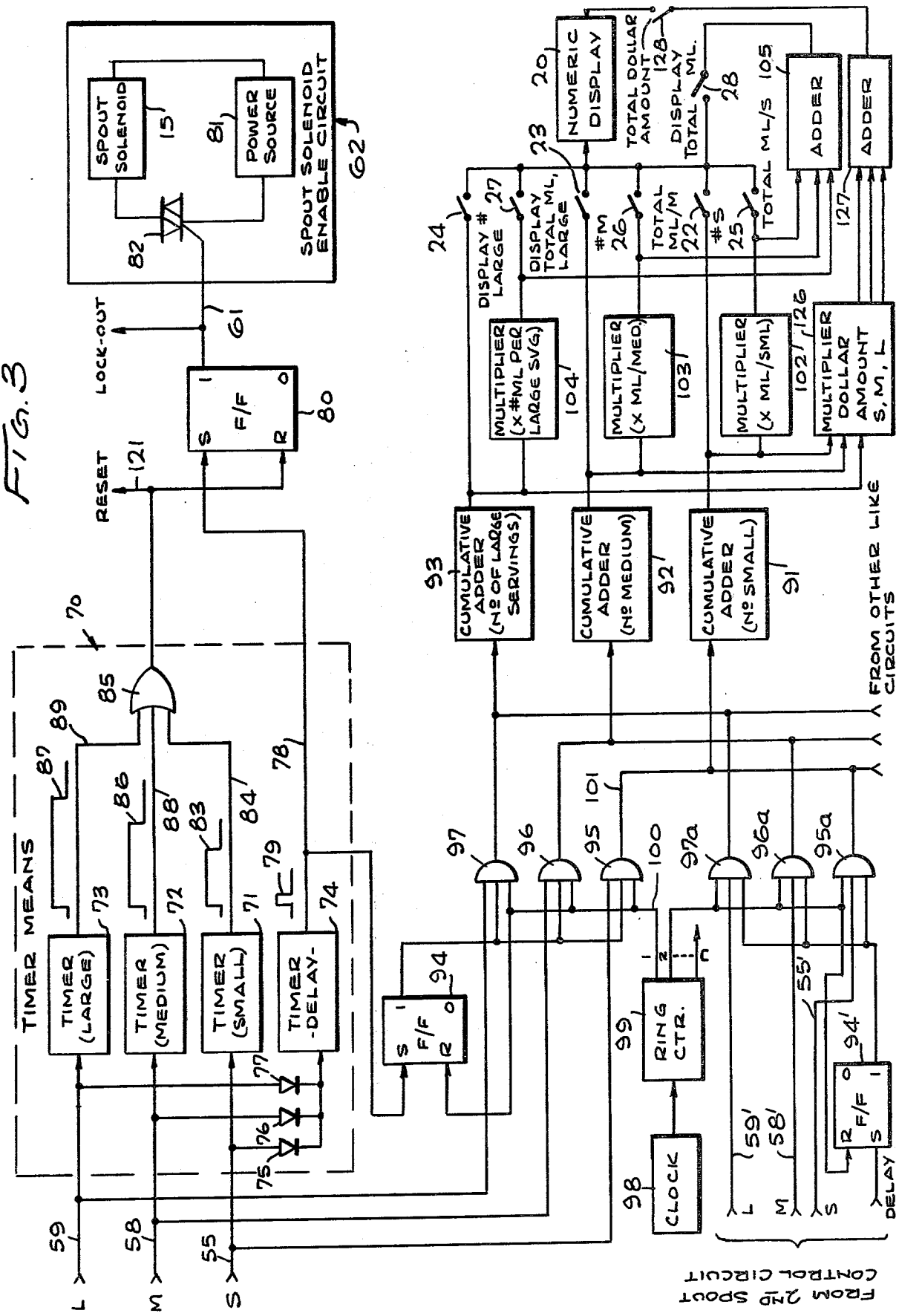
FIG. 3 is an electrical block diagram of the timer circuitry for controlling the spout solenoid of the fluid dispenser of FIG. 1, and of the counter and display circuitry useful with a plurality of such fluid dispensers.

Once the L, M, or S signal has been established, this condition is maintained throughout the pouring operation by occurence of a lock-out signal on a line 61 which is supplied from the timer circuitry of FIG. 3. This lock-out signal insures that the size-indicating signal will not change during the pouring operation, even though the cup 12 is off-centered with respect to the light from the LED's 18 S, M or L.

To this end, in the event that a S signal is present, occurence of the lock-out signal will result in both inputs to a NAND-gate 62 being high. The resultant low output is supplied via a diode 63 and a resistor 64 so as to maintain the line 46 at a low level. This will prevent occurence of the M or L signals so long as the lock-out signal remains high.

Similarly, if the M signal is high, occurence of the lock-out signal will cause a NAND-gate 65 to provide a low output. This low output, connected via a diode 66 and a resistor 67, will maintain the line 47 at a low level. The M signal will remain unchanged.

Referring now to FIG. 3, the pouring duration for the fluid dispenser 10 is established by timer means 70. In the illlustrative embodiment shown, this includes three timers 71, 72, and 73 which establish the pouring duration for relatively small, medium and large containers 5, 12 respectively. If a small container is present, occurence of the S signal on the line 55 will initiate operation both of the timer 71 and of a delay timer 74 that is connected to all of the lines 55, 58 and 59 via diode 75-77. The delay timer 74 produces on a line 78 a signal 79 of sufficient duration to permit firm placement of the container 12 on the dispenser 10 (FIG. 1). Lockout of the container-size-indicating signal and pouring of the liquid does not begin until the end of the delay duration established by the timer 74.

To this end, the final or trailing edge of the signal 79 from the delay timer 74 is used to set (S) a flip-flop 80 which begins the pouring cycle. When so set, the flip-flop 80 provides a high output on the line 61 which functions both as the lockout signal and as an enable signal to a spout solenoid enable circuit 62.

That is, the signal on the line 61 functions to open the spout solenoid valve 15 to begin dispensing of the liquid, and also serves as the lock-out signal which, as described above, maintains the size-indicating signal at the same value throughout the duration of pouring.

In the typical embodiment of FIG. 3, the circuit 62 includes a power source 81 that is connected to the spout solenoid 15 via a triac or other controlled rectifier 82. The signal on the line 61 is used to gate on the triac 82, and thereby begin the dispensing of fluid.

The pouring duration is established by one of the timers 71-73, in accordance with which size-indicating signal is present. For example, if the S signal on the line 55 is present, the "small" timer 71 will provide a signal 83 on line 84 to an OR-gate 85 the output of which is connected to the reset (R) input of the flip-flop 80. At the end of the timing cycle, when the signal 83 goes low, the trailing edge of the signal 83 will reset the flip-flop 80 to the "O" state, thereby terminating the signal on the line 61. This will turn off the triac 82, closing the spout solenoid and valve 15 to end the pouring operation. It will also end the lock-out signal, so that the circuitry of FIG. 2 will be in condition to sense the size of the next container to be filled. Similarly, for medium and large sized containers, the respective timers 72 and 73 provide signals 86 and 87 via the lines 88 and 89 to the OR-gate 85. These signals 86 and 87 are of appropriate duration to insure correct filling of a medium or large sized container.

Circuitry for tallying the number of containers of each size that are filled by a plurality of dispensers is shown at the bottom of FIG. 3. Referring thereto, separate cumulative adders 91, 92 and 93 are provided to maintain a count respectively of the number of small, medium and large containers that have been filled.

Each time that a container 12 is filled by the dispenser 10 of FIG. 1, the trailing edge of the delay pulse 79 sets a flip-flop 94. The resultant "1" output on the line 95 enables a set of three-input AND-gates 95, 96 and 97 which respectively receive the S, M or L signals from the lines 55, 58 and 59. The outputs of the gates 95-97 are connected respectively to the increment inputs of the adders 91-93. Sets of like AND-gates 95a-97a associated with other like dispensers also are connected to the same inputs of the adders 91-93.

A clock 98 and a ring counter 99 are used to scan the count inputs from the plural dispensers. Each time that the ring counter 99 contains a count of "1", a high signal is provided on a line 100 to the third input of the AND-gates 95-97. If the associated dispenser is filling a container which has not yet been tallied, the flip-flop 94 will be set and one of the signals S, M, or L will be present. Under this condition the AND-gate 95-97 corresponding to that size-indicating signal will provide an increment input to the corresponding adder. For example, if a small container is being poured, the high S signal on the line 55 will be provided via the AND-gate 95 and a line 101 to the input of the adder 91. This will increment the previous contents of that adder 91 by one, so that the contents of the adder 91 will indicate correctly the total number of small containers that have been filled. Occurence of the trailing edge of the scan signal on the line 100 will cause the flip-flop 94 to reset to "0". As a result, the AND-gates 95-97 will be disabled, thereby insuring that none of the adders 91-93 will be erroneously incremented when the ring counter 99 again reaches a count of "1" during the same pouring cycle. In this manner, the appropriate adder 91-93 is incremented once and only once for each pouring operation.

If a second fluid dispenser is filling a container at the same time as that shown in FIG. 1, a corresponding S, M, or L signal will occur on one of the lines 55", 58" or 59" associated with that other dispenser. During that pouring operation a like flip-flop 94 prime will be set so that when the ring counter 99 reaches a count of "2" the AND-gates 95a-97a will be enabled. This will result in an incrementing of the appropriate adder 91-93.

To display the number of small, medium or large containers that have been filled requires only that the corresponding switch 22, 23 or 24 will be closed. Contents of the corresponding adder 91-93 then will be shown on the numeric display 20.

To obtain a tally of the volume of liquid that has been dispensed, a multiplier 102, 103, 104 is associated with each adder 91, 92, 93. These multipliers may be set manually so as to multiply the number of filled containers by a value corresponding to the volume per container size, such as the number of milliliters in each small, medium or large container. The resultant total volume dispensed per selected size of container can be displayed by closing the corresponding switch 25-27, and thereby connecting the corresponding multiplier 102-104 output to the diaplay 20. For example, the contents of the adder 92 may indicate that 25 medium-size containers have been filled. If each such container holds 300 Ml., the multiplier 103 will multiply $25 \times 300$ and provide the product to the numeric display 20 which will indicate that a total of 7,500 ml. of fluid have been dispensed into medium-sized cups. An adder 105 sums the products from the multipliers 102 through 104 and thereby provides on a line 106 a signal indicative of the total volume of liquid dispensed for all sized containers. This will be displayed when the switch 28 is closed.

To obtain a tally for dollar value of the liquid served or dispensed, a multiplier 126 is associated with each adder 91, 92 and 93. The multipliers are set in a manner similar to those previously described. However, the values set correspond to dollar amounts or prices charged for the liquid in the respective volumes dispensed such as small, medium and large. The resultant dollar readout is derived from an adder 127 when switch 128 is closed and displayed on numeric display 20.

Figure 4:
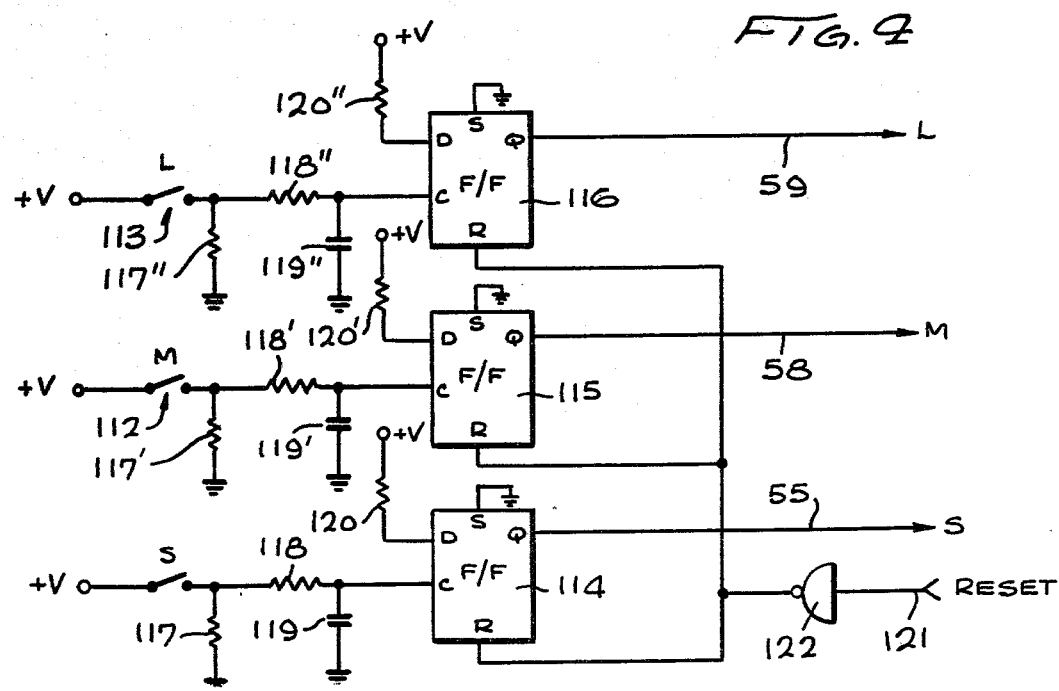
FIG. 4 is an electrical schematic diagram of alternative circuitry for providing the size-indicating signals.

In FIG. 4 there is shown an alternative means for providing the container-size-indicating signals, S, M, and L, using respective push-buttons 111, 112 and 113. This circuitry of FIG. 4 would be used in place of that of FIG. 2. The user would place his container under the spout 14, and actuate the appropriate switch 111, 112 or 113 corresponding to the container size.

Associated with each of the switches 111-113 is a respective D-type flip-flop 114, 115 and 116. Each of these may be implemented using an integrated circuit flip-flop such as the National Semiconductor type MM4613A.

The switch 111 is connected to the clock (C) input of the flip-flop 114 via a pair of resistors 117, 118 and a capacitor 119. The D input is held at a high level by a voltage supply via a resistor 120. With this arrangement, if the switch 111 is closed, the flip-flop 114 will be set to the "Q" state thereby providing a high S signal on the line 55. Similar components, with primed and double-primed numerals are associated with the flip-flops 115 and 116.

At the end of the pouring cycle, the flip-flop 114-116 which had been set, will be reset to terminate the size-indicating signal. To this end, the timing signal from the OR-gate 85 (FIG. 3) is supplied via a line 121 and an inverter 122 to the reset "R" inputs of each flip-flop. Thus, when the signal on the line 121 goes low, a high reset signal will be provided to the appropriate flip-flop 114-116.

Thus, there has been described a fluid dispensing mechanism for automatically sensing container size, dispensing the correct amount of fluid, and tallying both the number of containers of each size that have been filled and the volume of liquid that has been dispensed will be recorded and displayed. Although in the illustrative example, containers of three sizes have been shown, the invention is, of course, not so limited. Like arrangements can be used to dispense fluid into a smaller or greater number of container sizes.

The previous discussion relates to a novel liquid control dispenser system. In some instances, the liquid may be a combination of several ingredients such as soft drinks, which is composed of a particular mixture ratio of carbonated water and syrup. The following discussion discloses several methods for controlling the mixture ratio during the dispensing period and are illustrated in FIGS. 5-8 respectively.

Empirical tests indicate that the flow-rate of the carbonated water is constant within acceptable limits. The syrup flow-rate varies with temperature due to change in viscosity. Therefore, if the flow-rate of the syrup or the quantity of syrup per drink is controlled, the desired ratio of carbonated water to syrup is maintained. Although the dispensing systems presently attempt to maintain the syrup at a constant temperature, tests indicate that syrup temperature varies 10% to 20% depending upon dispensing conditions.

FIG. 5 shows a block system for controlling the dispensing of the syrup in proper quantity. The system includes temperature sensing means 130 for sensing the temperature of the syrup during the dispensing period and modulating the solenoid valve 15 via a pulse modulator 131 and the triac 82 so as to control the quantity of syrup dispensed. As syrup temperature increases, the solenoid is modulated with the "on time" decreasing and "off time" increasing.

FIG. 6 illustrates an alternate system including means 132 sensing the temperature of the syrup during the dispensing period and modulating the voltage to a throttle valve 133 via pulse modulator 132 so as to increase or decrease the restriction of the valve in order to maintain a constant flow-rate during the dispensing time period.

FIG. 7 illustrates a volumetric measurement system consisting of a continuous flow monitoring sensor 134 which measures volumetrically the quantity of syrup being dispensed. The solenoid valve 15 is modulated so as to dispense proper quantity of syrup via the pulse modulator 131 and switch 82 in response to the sensor 134.

FIG. 8 illustrates a system similar to the system shown in FIG. 7. However, the throttle valve 133 is employed to adjust the flow rate properly.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

Intending to claim all novel, useful and unobvious features shown or described, the inventor claims:

1. A fluid dispensing control system comprising:
   a fluid dispenser having a housing and electrically operated valve means, mounted in said housing, for dispensing a fluid into a container;
   sensor means for providing a selected one of a set of signals respectively indicative of the sizes of containers to be filled by said dispenser;
   valve control timer means, connected to said sensor means and to said valve means and responsive to said selected one signal, for opening said valve means for the period of time requisite to fill a container of the size indicated by said selected one signal;
   said sensor means comprises a set of light sources and associated photosensors mounted on said housing in respective locations such that when a container is positioned to be filled by said fluid dispenser, said positioned container will reflect light from said sources into a particular subset of said photosensors indicative of the size of said container; and
   circuit means, responsive to the outputs of said photosensors, for providing said selected one signal indicative of the size of the positioned container.

2. A fluid dispensing control system according to claim 1 wherein a first light source and its associated photosensor are mounted in a first location such that light will be reflected back to that photosensor only when a container of first, large size is positioned to be filled, wherein a second light source and its associated photosensor are mounted in a second location such that light will be reflected back to that photosensor only when a container of first, large or second, medium size is positioned to be filled, and wherein a third light source and its associated photosensor are mounted in a third location such that light will be reflected back to the photosensor when a container of first, large or second, medium or third, small size is positioned to be filled.

3. A fluid dispensing control system according to claim 1 further comprising lockout means, connected to said timer means and to said circuit means and operative after said selected one signal has been established, for maintaining said selected one signal unchanged until filling of said container has been completed.

4. A fluid dispensing control system according to claim 1 wherein said circuit means includes discrimination circuitry for distinguishing between ambient light and light reflected from a positioned container.

5. A fluid dispensing control system according to claim 4 wherein said discrimination circuitry comprises:
a pulse source connected intermittently to pulse on all of said light sources, a positioned container reflecting light from said pulsed light sources back to a particular subset of said photosensors, said subset being established by the size of said positioned container,
differential amplifier means associated with each of said photosensors for comparing the light level sensed by each photosensor at the time said light sources are pulsed with the ambient light level incident on said photosensors, and
gating circuitry, connected to the outputs of all said differential amplifiers and responsive thereto, for providing said selected one signal indicative of the size of said positioned container.

6. A fluid dispensing control system according to claim 4 wherein said discrimination circuitry comprises, for each photosensor;
a differential amplifier, said photosensor being connected to one input thereof,
first pulse means for pulsing on the light source associated with said photosensor,
integrator means, connected between the output of said photosensor and the other, reference input of said differential amplifier, for providing at said reference input a signal indicative of the ambient light level incident on said photosensor, and
gating means, cooperating with said integrator means, for effectively disconnecting said photosensor from said integrator means during the time of maximum photosensor response to light from the associated pulsed light source, whereby the light level sensed by said photosensor during said time of maximum responsiveness, as indicated by the photosensor signal provided to said differential amplifier one input, will be compared with the ambient light level, as indicated by the signal at said reference input provided by said integrator means, the output of said differential amplifier being indicative of said comparison, and thus indicative of the presence of a positioned container.

7. A fluid dispensing control system according to claim 6 wherein said differential amplifier is an operational amplifier, said one input being the non-inverting input thereof, wherein said integrator means comprises a capacitor connected to the inverting input of said operational amplifier and connected to be charged via a resistor from said photosensor, wherein said gating means comprises a gate connected in circuit with said resistor, said gate being normally conducting and being open circuited at the time of maximum responsiveness of said photosensor to light from said pulsed light sources.

8. A fluid dispensing control system according to claim 1 together with numeric display means, connected to said sensor means and responsive to said selected one signals, for displaying the cumulative number of containers of each size that have been filled by said fluid dispenser.

9. A fluid dispensing control system according to claim 8 together with one or more like fluid dispensers each having its own associated like sensor means, and further comprising counter connection means interconnected to the sensor means of all of said fluid dispensers and to said numeric display means, for accumulating and displaying on said display means the total number of containers of each size that have been filled by said fluid dispenser.

10. A fluid dispensing control system according to claim 8 further comprising fluid volume computing means, cooperating with said display means, for displaying the volume of fluid dispensed by said fluid dispenser in filling containers of one or more selected sizes.

11. A fluid dispensing control system comprising:
a fluid dispenser having a housing and electrically operated valve means, mounted in said housing, for dispensing a fluid into a container, and
sensor means for providing a selected one of a set of signals respectively indicative of the sizes of containers to be filled by said dispenser, said sensor means comprising;
a set of light sources and associated photosensors mounted on said housing in respective locations such that when a container is positioned to be filled by said fluid dispenser, said positioned container will reflect light from said sources into a particular subset of said photosensors indicative of the size of said container, and
circuit means, responsive to the outputs of said photosensors, for providing only said selected one signal indicative of the size of the positioned container.

12. The invention as defined in claim 11 including:
a network coupled into said circuit means for providing increased voltage and high gain to said selected one signal so as to maintain a fully operational input signal to said valve means.

13. The invention as defined in claim 11 including:
means operably coupled to said circuit means for totalling data and displaying data associated with amount of fluid dispensed and the dollar value of said fluid amount dispensed.

14. The invention as defined in claim 11 wherein said dispensing control system further includes a mixture ratio means for combining two or more fluid ingrediants;
said mixture ratio means operably coupled with said electrically operated valve means for achieving a predetermmined mixture ratio of said fluid ingrediants.

15. The invention as defined in claim 14 wherein said mixture ratio means includes temperature sensing means for detecting the temperature of a selected one of said ingredients and operably connected to said valve means for controlling dispensing of said selected ingrediant in response to the temperature.

16. The invention as defined in claim 14 wherein said mixture ratio means includes a volumetric sensing means for detecting the quantity of said selected ingrediant and operably connected to said valve means for controlling dispensing of said selected ingredient in response to the flow volume of said selected ingredient.

* * * * *